US010717519B2

(12) United States Patent
Lakebrink et al.

(10) Patent No.: US 10,717,519 B2
(45) Date of Patent: Jul. 21, 2020

(54) SIMPLIFIED FLUIDIC OSCILLATOR FOR CONTROLLING AERODYNAMICS OF AN AIRCRAFT

(71) Applicant: THE BOEING COMPANY, Chicago, IL (US)

(72) Inventors: Matthew T. Lakebrink, Florissant, MO (US); Mortaza Mani, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/134,644

(22) Filed: Sep. 18, 2018

(65) Prior Publication Data

US 2019/0152584 A1 May 23, 2019

Related U.S. Application Data

(63) Continuation of application No. 14/955,692, filed on Dec. 1, 2015, now Pat. No. 10,081,420.

(51) Int. Cl.
*B64C 21/00* (2006.01)
*B64C 21/02* (2006.01)
*B64C 21/04* (2006.01)

(52) U.S. Cl.
CPC ............ *B64C 21/025* (2013.01); *B64C 21/04* (2013.01); *B64C 2230/04* (2013.01);
(Continued)

(58) Field of Classification Search
CPC ....... B64C 21/00; B64C 21/02; B64C 21/025; B64C 21/04; B64C 21/06; B64C 23/06; B64C 2230/18; B64C 2230/20
See application file for complete search history.

(56) References Cited

U.S. PATENT DOCUMENTS 4,260,106 A    4/1981  Bauer
4,721,251 A *  1/1988  Kondo .................. B05B 1/08
                                                      137/839
(Continued)

FOREIGN PATENT DOCUMENTS

CN          2555098 Y       6/2003

OTHER PUBLICATIONS

Tewes et al. "Control of Separation on a Swept Wing Using Fluidic Oscillators" AIAA SciTech, Jan. 5-9, 2015, Kissimmee, Florida, 53rd AIAA Aerospace Sciences Meeting, pp. 1-15.
(Continued)

*Primary Examiner* — Richard G Davis
(74) *Attorney, Agent, or Firm* — Patterson + Sheridan, LLP

(57) ABSTRACT

Method and apparatus for controlling the aerodynamics of an aircraft using an active flow control system is disclosed herein. In one example, the active flow control system includes an airframe and a plurality of fluidic oscillators. The airframe includes an inlet configured for flight speeds ranging from subsonic to hypersonic. The plurality of fluidic oscillators is mounted about a curvature of the airframe. Each fluidic oscillator includes a body and an integral nozzle coupled to the body. The body has an inflow portion and a narrow nozzle inlet formed opposite the inflow portion. The integral nozzle is coupled to the body by the narrow nozzle inlet. The narrow nozzle inlet forms a single fluid flow path from the inflow portion to the narrow nozzle inlet.

20 Claims, 5 Drawing Sheets

(52) U.S. Cl.
CPC ...... *B64C 2230/18* (2013.01); *B64C 2230/20* (2013.01); *B64C 2230/22* (2013.01); *Y02T 50/166* (2013.01)

(56) References Cited

U.S. PATENT DOCUMENTS

| | | | | |
|---|---|---|---|---|
| 5,181,660 | A * | 1/1993 | Stouffer | B05B 1/08 137/811 |
| 5,213,269 | A * | 5/1993 | Srinath | B05B 1/08 137/826 |
| 5,447,283 | A * | 9/1995 | Tindell | B64C 21/04 244/207 |
| 5,971,301 | A | 10/1999 | Stouffer et al. | |
| 6,371,414 | B1 * | 4/2002 | Truax | B64C 23/06 138/38 |
| 6,948,244 | B1 * | 9/2005 | Crockett | B05B 1/08 137/826 |
| 8,382,043 | B1 * | 2/2013 | Raghu | B64C 21/04 244/1 N |
| 9,429,071 | B2 * | 8/2016 | Quackenbush | F02C 7/04 |
| 2003/0234303 | A1 * | 12/2003 | Berning | B05B 1/08 239/589.1 |
| 2004/0164189 | A1 * | 8/2004 | Berning | B05B 1/08 239/589.1 |
| 2009/0261206 | A1 * | 10/2009 | Alvi | B64C 21/04 244/207 |
| 2011/0232792 | A1 | 9/2011 | Oates et al. | |
| 2015/0108269 | A1 * | 4/2015 | Lugg | B64C 1/26 244/13 |
| 2015/0251711 | A1 * | 9/2015 | Carlson | B62D 35/00 296/180.1 |
| 2017/0152023 | A1 | 6/2017 | Lakebrink et al. | |

OTHER PUBLICATIONS

Cerretelli et al. "Unsteady Separation Control on Wind Turbine Blades Using Fluidic Oscillators" AIAA Journal, vol. 48, No. 7, Jul. 2010, pp. 1302-1311.

Choephel et al. "Airfoil Boundary-Layer Flow Control Using Fluidic Oscillators", 30th AIAA Applied Aerodynamics Conference, Jun. 25-28, 2012, New Orleans, Louisiana, pp. 1-11.

European Search Report dated Aug. 30, 2017 for Application No. 16190359.6-1754/3176081.

* cited by examiner

SIMPLIFIED FLUIDIC OSCILLATOR FOR CONTROLLING AERODYNAMICS OF AN AIRCRAFT

CROSS-REFERENCE TO RELATED APPLICATION

This application is a continuation of co-pending U.S. application Ser. No. 14/955,692, filed Dec. 1, 2015 and entitled "A SIMPLIFIED FLUIDIC OSCILLATOR FOR CONTROLLING AERODYNAMICS OF AN AIRCRAFT", which issued as U.S. Pat. No. 10,081,420 on Sep. 25, 2018. The aforementioned patent application is herein incorporated by reference in its entirety.

GOVERNMENT RIGHTS

This disclosure was made with Government support under contract number N00014-14-1-0014 awarded by the United States Navy. The government has certain rights in this disclosure.

BACKGROUND

The present disclosure relates to fluid flow for an aircraft, and more specifically, to a method and apparatus for controlling the aerodynamics of an aircraft using a fluidic oscillator.

In operating an aircraft, fluid control systems may be used for operation of the aircraft and components within or on the aircraft. The fluid control systems are used during different phases of the operation. For example, the fluid control systems may be used during take-off, in flight, landing, taxiing on the runway, or during other phases of operation while the aircraft is in service. The fluid control systems are used to control the flow of fluid over, in, or through various portions of the aircraft during these phases of operation.

Traditional passive vortex generators, such as vanes and ramps, have demonstrated partial success in controlling separation and improving performance in diffusers. A drawback to the traditional passive vortex generators, however, is that they obstruct the flow path, and therefore, always introduce total pressure loss and increased drag. Additionally, the traditional passive vortex generators are tuned to specific operation conditions, and are not easily made flexible to provide performance improvement across an operating envelope.

Conventional active flow controllers, such as synthetic jets, steady jets, and traditional fluid control actuators, have been shown to be effective at controlling flow separation. These active flow controllers are also capable of being integrated flush with the diffuser so as to not introduce flow obstruction paths. However, the drawback to the conventional active flow controllers is that the performance improvement margins from the passive vortex generators are often not great enough to offset the cost and complexity of installation of the conventional active flow controllers. Thus, the difficulty in installation and high cost of manufacture result in fluid control systems below optimal levels of performance.

SUMMARY

An active flow control system for an aircraft, according to a first example, is disclosed herein. The active flow control system includes an airframe and a plurality of fluidic oscillators mounted about a curvature of the airframe. The airframe has an inlet configured for flight speeds ranging from subsonic to hypersonic. Each fluidic oscillator includes a body and an integral nozzle. The body has an inflow portion and a narrow nozzle inlet formed opposite the inflow portion. The integral nozzle is coupled to the body by the narrow nozzle inlet. The narrow nozzle inlet forms a single fluid flow path from the inflow portion to the narrow nozzle inlet.

The active flow control system for an aircraft according to the first example, wherein the integral nozzle includes curved sidewalls angled with respect to the narrow nozzle inlet.

The active flow control system for an aircraft according to the first example, wherein the angled curved sidewalls create a jet of fluid in a throat of the nozzle.

The active flow control system for an aircraft according to the first example, wherein the formation of the single fluid flow path reduces a size of the fluidic oscillator by at least a factor of 2.

The active flow control system for an aircraft according to the first example, wherein the formation of the single fluid flow path reduces a weight of the fluidic oscillator by at least a factor of 2.

The active flow control system for an aircraft according to the first example, wherein an angle formed between the nozzle and the body of the fluidic oscillator is less than 90 degrees.

The active flow control system for an aircraft according to the first example, wherein the plurality of fluidic oscillators are mounted about a curvature transition of the airframe, upstream of a flow separation.

Moreover, aspects herein include any alternatives, variations, and modifications of the preceding arrangement of configurations of the active flow control system for an aircraft recited above.

An apparatus for managing flow control, according to a second example, is disclosed herein. The apparatus includes a body and an integral nozzle. The body has an inflow portion and a narrow nozzle inlet formed opposite the inflow portion. The integral nozzle is coupled to the body by the narrow nozzle inlet. The narrow nozzle inlet forms a single fluid flow path from the inflow portion to the narrow nozzle inlet.

The apparatus for managing flow control according to the second example, wherein the integral nozzle includes curved sidewalls angled with respect to the narrowed nozzle inlet.

The apparatus for managing flow control according to the second example, wherein the angled curved sidewalls create a jet of fluid in a throat of the nozzle.

The apparatus for managing flow control according to the second example, wherein the formation of the single fluid flow path reduces a size of the fluidic oscillator by at least a factor of 2.

The apparatus for managing flow control according to the second example, wherein the formation of the single fluid flow path reduces a weight of the fluidic oscillator by at least a factor of 2.

The apparatus for managing flow control according to the second example, wherein the narrow nozzle inlet has a first diameter and the integral nozzle has an outlet, formed opposite the narrow nozzle inlet, having a second diameter less than the first diameter.

The apparatus for managing flow control according to the second example, wherein an angle formed between the nozzle and the body of the fluidic oscillator is less than 90 degrees.

Moreover, aspects herein include any alternatives, variations, and modifications of the preceding arrangement of configurations of the apparatus for managing flow control recited above.

A method for managing flow of a fluid, according to a third example, is disclosed herein. The method includes receiving a fluid flow into an inflow portion formed in a body of a fluidic oscillator, transmitting the fluid flow from the inflow portion of the fluidic oscillator to a narrow nozzle inlet formed in the body, opposite the inflow portion, along a single fluid flow path, creating a jet of fluid from the fluid flow in a throat of a nozzle, the nozzle integral with the body at the narrow nozzle inlet, and causing the jet of fluid to exit the nozzle in a direction that changes periodically with time.

The method for managing flow of a fluid according to the third example, wherein the integral nozzle includes curved sidewalls, angled with respect to the narrow nozzle inlet, configured to change the direction of the fluid as the fluid exits the nozzle.

The method for managing flow of a fluid according to the third example, wherein the single fluid flow path reduces a size of each fluidic oscillator by at least a factor of 2.

The method for managing flow of a fluid according to the third example, wherein causing the jet of fluid to exit the nozzle in a direction that changes periodically with time at a low frequency causes the fluid exiting the outlet of the nozzle to sweep across exit of the integral nozzle.

The method for managing flow of a fluid according to the third example, wherein causing the jet of fluid to exit the nozzle in a direction that changes periodically with time at a high frequency causes the fluid exiting the outlet of the integral nozzle to mix jet-energy with a surrounding fluid flow-field.

The method for managing flow of a fluid according to the third example, wherein the single fluid flow path reduces a weight of each fluidic oscillator by at least a factor of 2.

Moreover, aspects herein include any alternatives, variations, and modifications of the preceding arrangement or configurations of the method for managing flow of a fluid recited above.

The features, functions, and advantages that have been discussed can be achieved independently in various embodiments or may be combined in yet other embodiments further details of which can be seen with reference to the following description and drawings.

DETAILED DESCRIPTION

Figure 1:
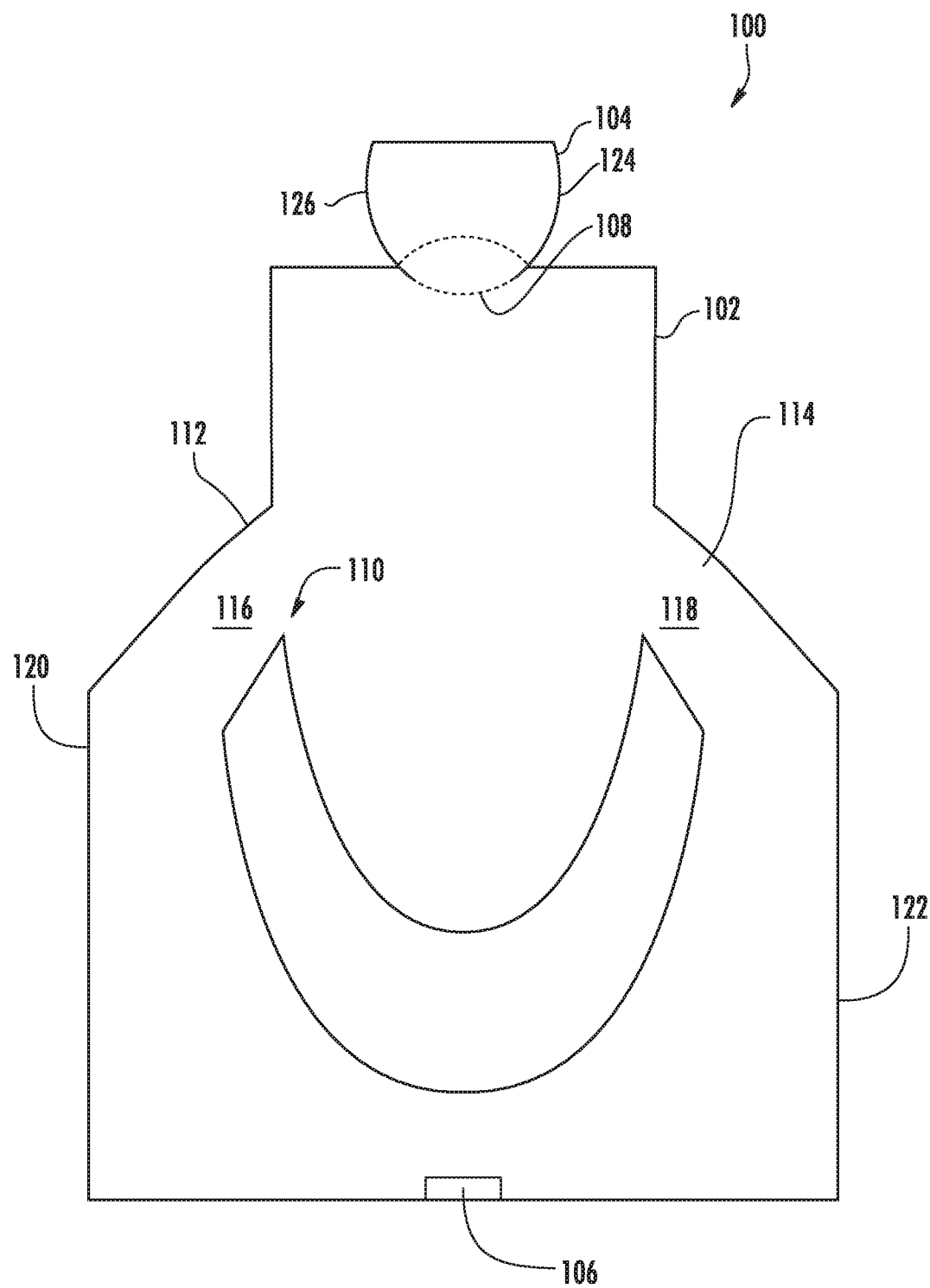
FIG. 1 illustrates a conventional fluidic oscillator for controlling the aerodynamics of an aircraft.

FIG. 1 illustrates a conventional fluidic oscillator 100 for use in an aircraft. The fluidic oscillator 100 includes a body 102 and an integral nozzle 104 coupled to the body 102. The body 102 includes an inflow portion 106 and a narrow nozzle inlet 108 formed opposite the inflow portion 106. The narrow nozzle inlet 108 couples the nozzle 104 to the body 102.

A feedback control loop 110 is formed in the body 102 of the fluidic oscillator 100. The feedback control loop 110 is configured to create an oscillating jet of fluid that exits the fluidic oscillator 100 through the nozzle 104. The feedback control loop 110 includes a plurality of feedback channels 112, 114. When a fluid enters the fluidic oscillator 100 through the inflow portion 106, the fluid is split between the feedback channels 112, 114, forming two fluid flow paths: a first fluid flow path 116 through the first feedback channel 112 and a second fluid flow path 118 through the second feedback channel 114.

The first fluid flow path 116 and the second fluid flow path 118 exit the fluidic oscillator 100 through the nozzle 104 in an alternating fashion. Assuming that the fluid initially travels along the first side 120 of the body 102, the fluid will follow the first fluid flow path 116 through the first feedback channel 112 to the nozzle 104. The fluid exits the nozzle 104 along a second side 124 of the nozzle 104. The fluid exits the nozzle 104 along the second side 124 of the nozzle because of the direction of the fluid delivered by the first feedback channel 112. Similarly, assuming the fluid initially travels along the second side wall 122 of the body 102, the fluid will follow the second fluid flow path 118 through the second feedback channel 114, and exit the nozzle 104 along a first side 126 of the nozzle. The fluid entering the inflow portion 106 will alternate following the first fluid flow path 116 and exiting the nozzle 104 along the second side 124 of the nozzle 104 and following the second fluid flow path 118 and exiting the nozzle 104 along the first side 122 of the nozzle 104, thus creating an oscillating jet of fluid exiting the nozzle 104.

When operating at a high pressure ratio greater than 2.0, the flow physics associated with the high pressure ratio chokes the throat of the fluidic oscillator 100, which negates the influence of the feedback control loop 110. The jet of fluid relies on the curvature of the nozzle 104 to exit the fluidic oscillator in an oscillating manner. Thus, at high pressure ratios, the feedback control loop 110 proves to be unnecessary, and needlessly adds size and weight to the fluidic oscillator 100, and results in difficult aircraft integration due to its complicated design.

Figure 2:
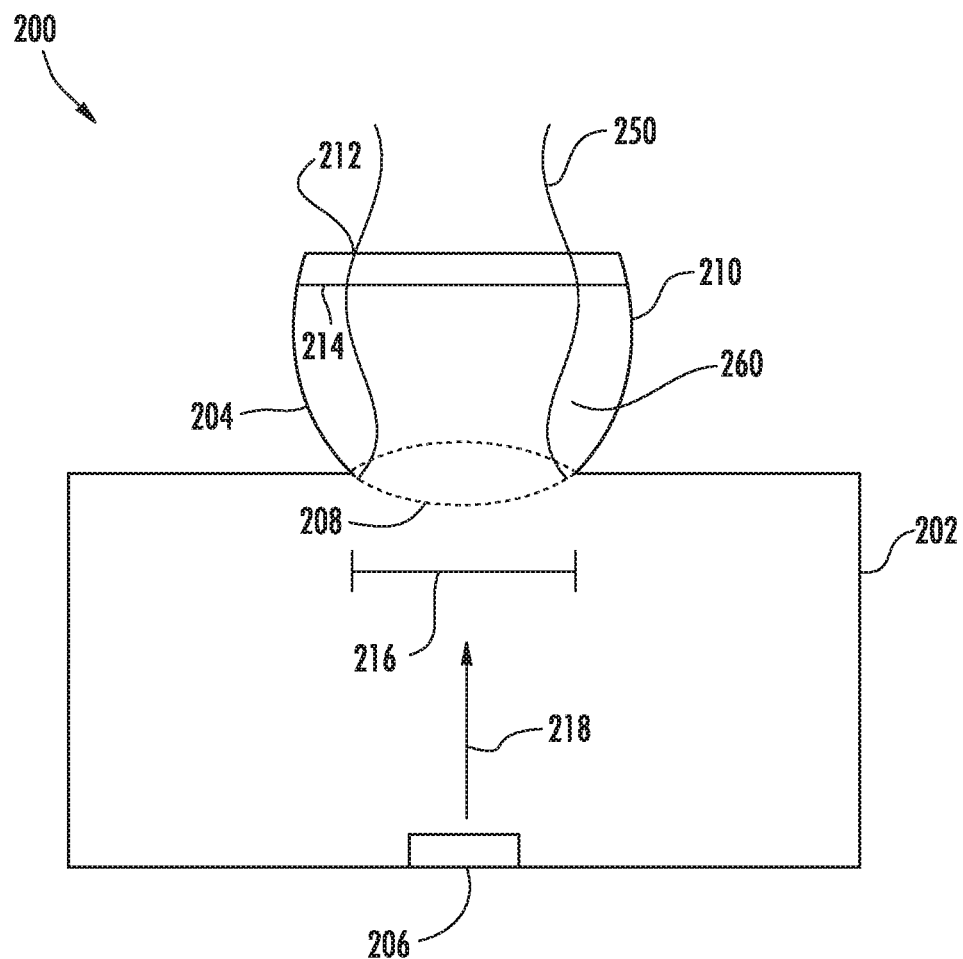
FIG. 2 illustrates an improved conventional fluidic oscillator for controlling the aerodynamics of an aircraft, according to one example.

FIG. 2 illustrates an improved fluidic oscillator 200 for use in an aircraft, according to one example. The fluidic oscillator 200 includes a body 202 and an integral nozzle 204 coupled to the body 202. The body 202 includes an inflow portion 206 and a narrow nozzle inlet 208 formed opposite the inflow portion 206. The narrow nozzle inlet 208 couples the nozzle 204 to the body 202. The nozzle 204 includes curved sidewalls 210 and an outlet 212. The curved sidewalls 210 are angled with respect to the narrow nozzle inlet 208. For example, the curved sidewalls 210 may be angled between 0° and 90° with respect to the narrow nozzle inlet 208. In a specific example, the curved sidewalls 210 are angled at about 31° with respect to the narrow nozzle inlet 208. The outlet 212 is formed in the nozzle 204 opposite the narrow nozzle inlet 208. The outlet 212 is sized such that the outlet 212 has a diameter 214 larger than a diameter 216 of the narrow nozzle inlet 208. For example, the diameter 214 of the outlet 212 may be about 0.04 inches and the diameter 216 of the narrow nozzle inlet 208 may be about 0.02 inches. The area enclosed by the narrow nozzle inlet 208 is referred to as the geometric throat 260 of the nozzle 204.

A single fluid flow path 218 is formed in the improved fluidic oscillator 200 from the inflow portion 206 to the outlet 212. As the fluid entering the fluidic oscillator 200 through the inflow portion 206 reaches the narrow nozzle inlet 208, a jet 250 of fluid may be formed in the nozzle 204. The jet 250 of fluid is formed provided that the fluid enters the narrow nozzle inlet 208 at a minimum pressure ratio, such as a pressure ratio greater than 2.0. The minimum pressure ratio chokes the throat 260 of the fluidic oscillator 200, resulting in a Mach number of unity at the throat 260. The formation of the jet 250 in the nozzle 204 between the sidewalls allows the fluid to exit the nozzle 204 in an oscillating matter. This is due to the space formed between the jet 250 and the sidewalls 210 of the nozzle 204. Therefore, the need for a feedback control loop, such as in a traditional fluidic oscillator 100, is no longer needed. The removal of the feedback control loop increases vehicle integration potential and reduces fabrication complexity and cost compared to conventional devices and systems. For example, removing the feedback control loop reduces the size and the weight of the traditional fluidic oscillator by at least a factor of 2. These gains are realized without compromising the benefit of the jet exiting the nozzle.

Figure 3:
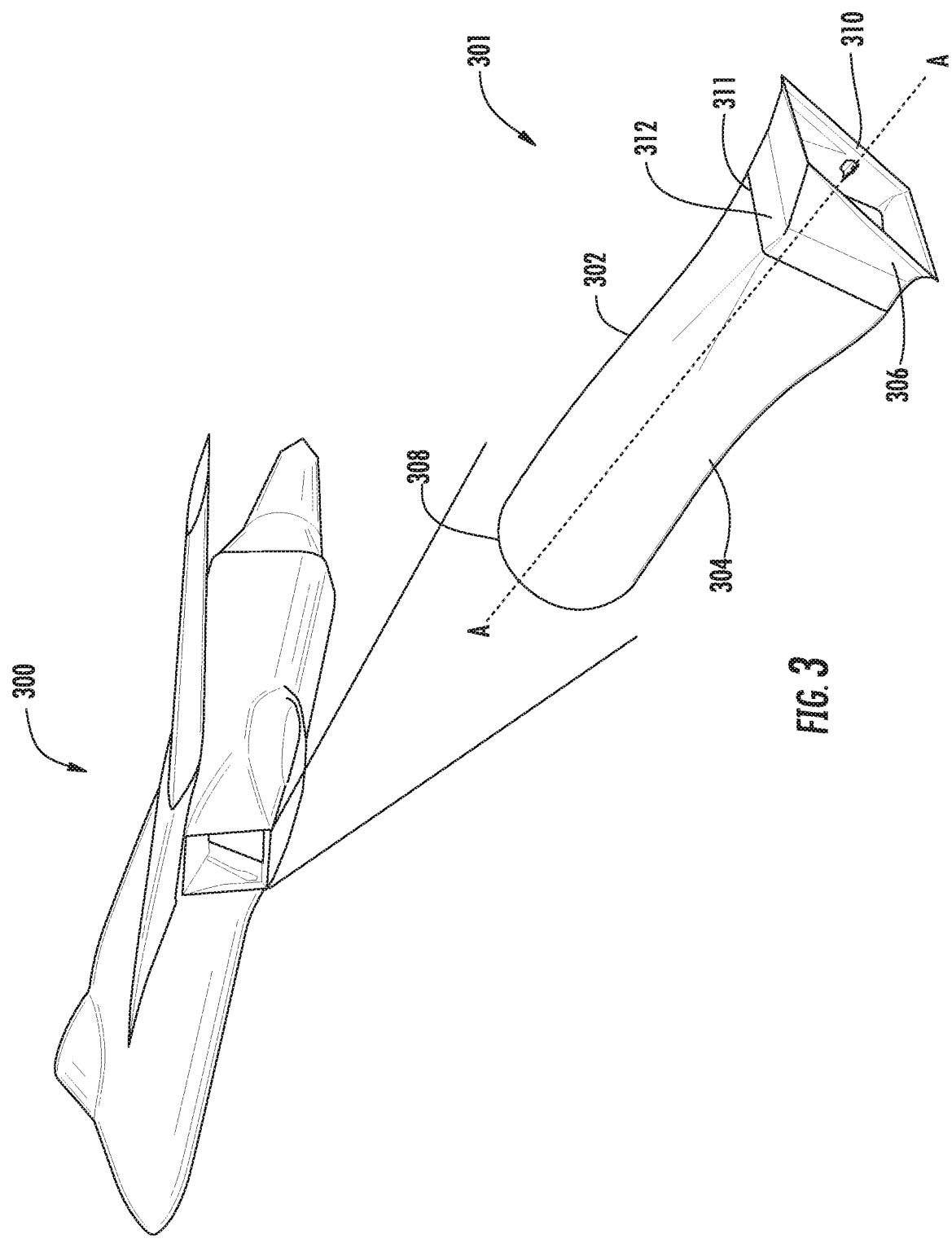
FIG. 3 illustrates an aircraft having an active flow control system for controlling the aerodynamics of the aircraft, according to one example.

FIG. 3 illustrates an aircraft 300 having an active flow control system 301 for controlling the aerodynamics of the aircraft 300, according to one example. The aircraft 300 is one example of an aircraft in which the active flow control system 301 may be implemented as an active flow control system for controlling the aerodynamics of the aircraft. The flow control system may be implemented in the aircraft 300 to perform various functions, such as maintaining desired airflow. For example, the flow control system 301 may be used to maintain desired airflow such as a boundary layer over a wing or stabilizer of the aircraft 300. In the example shown in FIG. 3, the fluid control system 301 is implemented to control the flow of fluid beneath a wing of the aircraft 300.

The flow control system 301 includes an airframe 302 positioned beneath a wing of the aircraft 300. In the embodiment shown in FIG. 2, the airframe 302 is a diffuser. The diffuser 302 includes an s-shaped elongated body 304 having a first end 306 open to ambient air and a second end 308. The second end 308 is an aerodynamic interface plane, where the second end 308 of the diffuser 302 meets the compressor of the aircraft 300. The diffuser 302 is coupled to an inlet 310 at the first end 306. An interface 311 of the diffuser 302 and the inlet 310 forms a throat region 312. The diffuser 302 and inlet 310 are configured for flight speeds ranging from subsonic to hypersonic.

As a fluid enters the inlet 310 and flows through the diffuser 302, the fluid has a tendency to separate from the surface. The flow separation occurs when the fluid becomes detached from the inner surface of the diffuser 302, and forms eddies and vortices within the diffuser. The flow separation results in increased drag, such as pressure drag, which is caused by the pressure differential between the front and rear surfaces of the diffuser 302 as the fluid travels through the diffuser 302.

Figure 4:
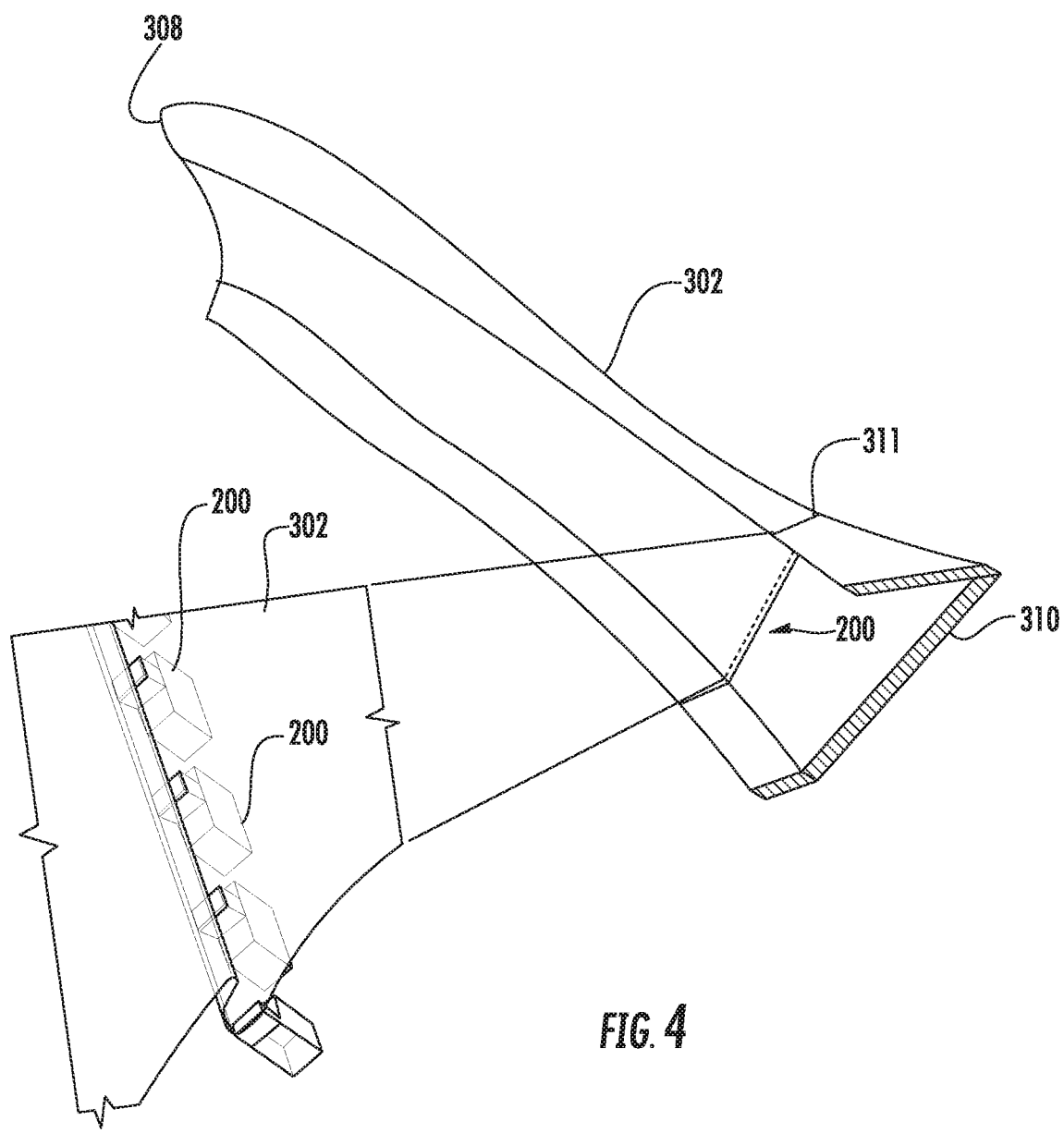
FIG. 4 illustrates a cross sectional view of a portion of the aircraft in FIG. 3, according to one example.

FIG. 4 illustrates a cross-sectional view of the diffuser 302 taken across the A-A line. To control the fluid separation that occurs in the diffuser 302, a plurality of fluidic oscillators 200 are positioned about a curvature of the diffuser 302. For example, the fluidic oscillators 200 may be positioned at the interface 311 of the diffuser 302 and the inlet 310. Positioning the fluidic oscillators 200 at the interface 311 allows the fluidic oscillators 200 to be positioned upstream of where separation is likely to occur. In another embodiment, the fluidic oscillators 200 may be positioned downstream of the interface 311. The number of fluidic oscillators used may depend on a number of factors, some of which include, the size and weight of each fluidic oscillator, the size of the diffuser 302, and the degree of the flow separation. In the example shown in FIG. 4, about fourteen fluidic oscillators are arranged about the curvature transition of the inlet.

Figure 5:
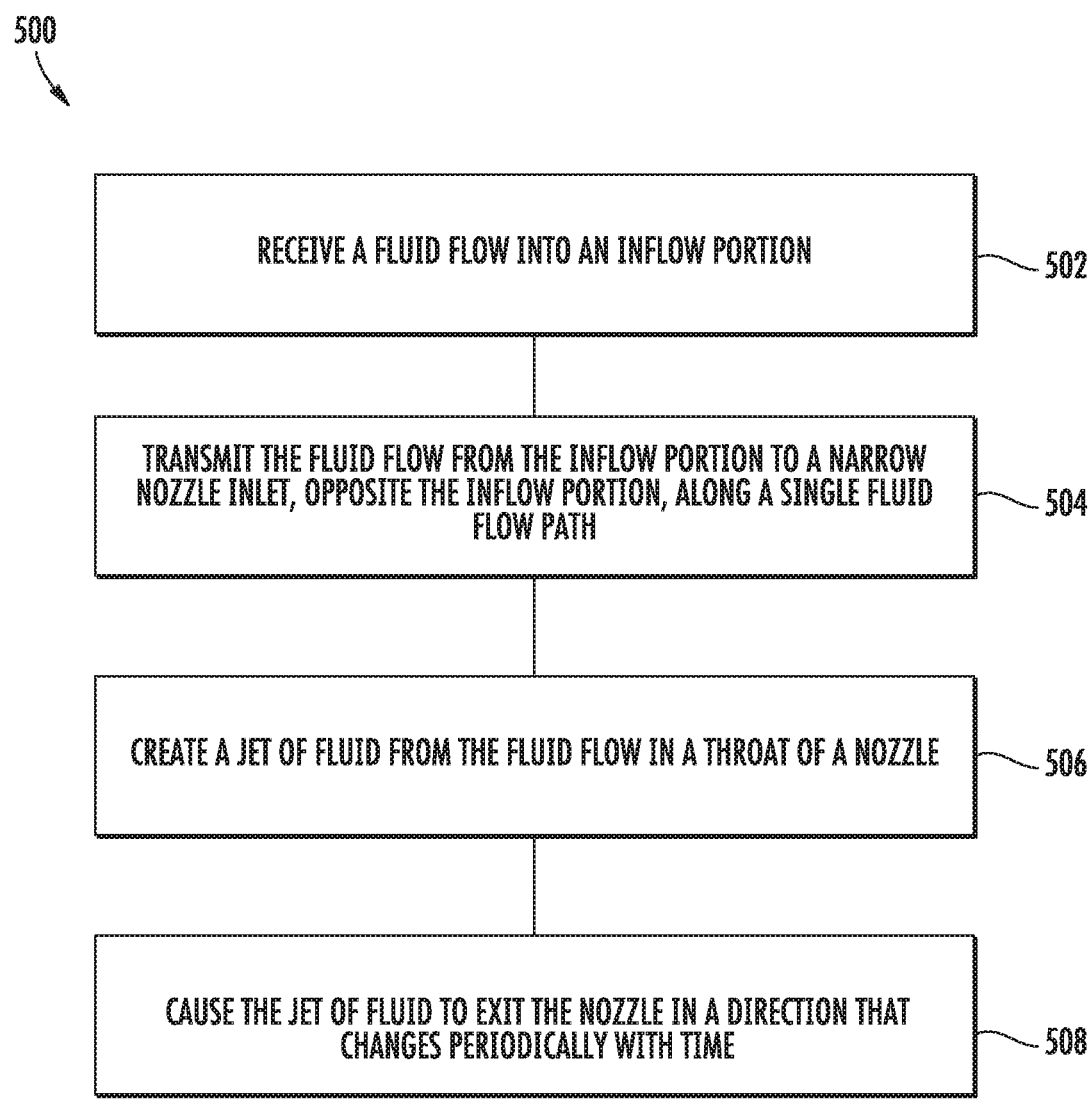
FIG. 5 illustrates a method for managing flow of a fluid, according to one example.

FIG. 5 illustrates a method 500 for managing flow of a fluid, according to one example. The method 500 begins at step 502.

At step 502, the fluidic oscillator receives a fluid flow into an inlet formed in a body of the fluidic oscillator. The fluidic oscillator may be part of an active flow control system for an aircraft having an airframe with an inlet configured for flight speeds ranging from subsonic to hypersonic. The fluidic oscillators may be mounted about a curvature transition of the inlet. The fluid control system is configured to control the aerodynamics of the aircraft.

At step 504, the fluid is transmitted from the inflow portion of the fluidic oscillator to a narrow nozzle inlet formed in the body opposite the inflow portion, along a single fluid flow path. The single fluid flow path is formed by positioning the narrow nozzle inlet opposite the inflow portion of the fluidic oscillator. The fluidic oscillator does not contain a feedback control loop, which is necessary in traditional fluidic oscillators. Thus, there is only a single path the fluid may follow when entering the body of the fluidic oscillator.

At step 506, a jet of fluid is created in a throat of a nozzle that is integral with the body of the fluidic oscillator at the narrow nozzle inlet. The nozzle includes curved sidewalls, which, are integral with the narrow nozzle inlet, and an outlet, which is formed opposite the narrow nozzle inlet. The narrow nozzle inlet has a first diameter, which is less than a diameter of the outlet of the nozzle. When the fluid passes through the narrow nozzle inlet, at a minimum pressure ratio, a jet of fluid is created in the throat of the nozzle. The minimum pressure ratio chokes the throat of the fluidic oscillator. For example, a Mach number of unity is sufficient to choke the throat of the fluidic oscillator.

At step 508, the jet of fluid is caused to exit the nozzle in a direction that changes periodically with time. The formation of the jet in the throat of the nozzle, between the curved sidewalls, allows the jet of fluid to exit the nozzle in an oscillating matter. This is due to the space formed between the jet and the sidewalls of the nozzle by angling the sidewalls with respect to the narrow nozzle inlet. In one embodiment, the angle between the curved sidewalls and the narrow nozzle inlet is less than 90°. In a specific embodiment, the angle between the curved sidewalls and the narrow nozzle inlet is about 31°. Increasing or decreasing the angle between the curved sidewalls and the narrow nozzle inlet will increase or decrease the frequency at which the jet oscillates upon exit of the nozzle.

When the jet of fluid exits the nozzle, the fluidic oscillator may operate in two specific modes: a sweeping mode and a shedding mode. When the plume in the jet of fluid separates from the nozzle sidewalls, this causes the fluidic oscillator to operate in a sweeping, or low frequency mode (e.g., 10 kHz). As a result, the jet of fluid exiting the nozzle will sweep from side to side with a small angular amplitude (e.g., less than 20° from peak to peak). When the plume begins to break-up, or expand, from the jet of fluid, the fluid oscillator operates in a shedding, or high frequency mode (e.g., 200 kHz). The plume "sheds," resulting in the spatial and temporal rapid mixing of the jet-energy with the surrounding flow field.

The formation of a single fluid flow path between the inflow portion and the narrow nozzle inlet increases vehicle integration potential and reduces fabrication complexity and cost compared to conventional flow control systems. The simplified fluidic oscillator works as efficiently as the conventional fluidic oscillator at a fraction of the size and weight of the conventional oscillator. Thus, the gains from utilizing a single fluid flow path are realized without compromising the benefit of the jet exiting the nozzle of the fluidic oscillator.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

While the foregoing is directed to embodiments of the present disclosure, other and further embodiments of the disclosure may be devised without departing from the basic scope thereof, and the scope thereof is determined by the claims that follow.

What is claimed is:

1. A flow control apparatus comprising:
   a body portion defining a body inlet and a body outlet opposite the body inlet, wherein an area of the body outlet is smaller than an area of the body inlet, wherein the body portion is dimensioned to form a single fluid flow path from the inlet to the outlet for a predetermined range of fluid flow speeds; and
   a nozzle portion defining a nozzle inlet and a nozzle outlet opposite the nozzle inlet, wherein the nozzle inlet is disposed at the body outlet, wherein an area of the nozzle inlet is smaller than an area of the nozzle outlet, the nozzle portion comprising:
   a plurality of curved sidewalls bowed outward from the nozzle inlet to the nozzle outlet, wherein the plurality of curved sidewalls is dimensioned to form an oscillating jet of fluid provided via the single fluid flow path.

2. The flow control apparatus of claim 1, wherein the nozzle portion is integrated with the body portion.

3. The flow control apparatus of claim 2, wherein the body portion has a rectangular shape and further defines a plurality of planar sidewalls,
   wherein a first planar sidewall of the plurality of planar sidewalls extends between the plurality of curved sidewalls, and
   wherein a second planar sidewall of the plurality of planar sidewalls that is opposite the first planar sidewall extends between the plurality of curved sidewalls.

4. The flow control apparatus of claim 1, wherein the body portion is connected with an airframe, and
   wherein the predetermined range of fluid flow speeds includes subsonic flight speeds and hypersonic flight speeds.

5. The flow control apparatus of claim 1, wherein a throat of the nozzle portion is defined between the plurality of curved sidewalls, and
   wherein the area of the nozzle inlet is selected such that, for pressures meeting a predefined pressure ratio, the oscillating jet of fluid is formed in the throat.

6. The flow control apparatus of claim 5, wherein at the pressures meeting the predefined pressure ratio, a velocity of the fluid at the throat is Mach 1.

7. The flow control apparatus of claim 1, wherein the formation of the single fluid flow path enables a size of the flow control apparatus to be reduced by at least a factor of 2, when compared with an alternate implementation having a feedback control loop formed in the body portion.

8. The flow control apparatus of claim 1, wherein the formation of the single fluid flow path enables a weight of the flow control apparatus to be reduced by at least a factor of 2, when compared with an alternate implementation having a feedback control loop formed in the body portion.

9. The flow control apparatus of claim 1, wherein the plurality of curved sidewalls extends from the nozzle inlet at angles selected such that the nozzle portion is dimensioned to form the oscillating jet of fluid.

10. The flow control apparatus of claim 9, wherein the angles are less than 90 degrees from a line extending perpendicularly from the nozzle inlet toward the nozzle outlet.

11. The flow control apparatus of claim 10, wherein the angles are about 31 degrees from the line.

12. The flow control apparatus of claim 1, wherein the oscillating jet of fluid oscillates according to at least a first, sweeping mode caused by a plume of the oscillating jet separating from the curved sidewalls.

13. The flow control apparatus of claim 12, wherein the oscillating jet of fluid oscillates according to a second, shedding mode caused by a break-up of the plume,
   wherein a frequency of the second, shedding mode is greater than a frequency of the first, sweeping mode.

14. A flow control system for a vehicle, the flow control system comprising:
   a vehicle body having a fluid inlet; and
   at least one fluidic oscillator mounted to the vehicle body, wherein the fluidic oscillator comprises:
   a body portion defining a body inlet and a body outlet opposite the body inlet, wherein the body inlet is in fluid communication with the fluid inlet, wherein an area of the body outlet is smaller than an area of the body inlet, wherein the body portion is dimensioned to form a single fluid flow path from the inlet to the outlet for a predetermined range of fluid flow speeds; and a nozzle portion defining a nozzle inlet and a nozzle outlet opposite the nozzle inlet, wherein the nozzle inlet is disposed at the body outlet, wherein an area of the nozzle inlet is smaller than an area of the nozzle outlet, the nozzle portion comprising:

a plurality of curved sidewalls bowed outward from the nozzle inlet to the nozzle outlet, wherein the plurality of curved sidewalls is dimensioned to form an oscillating jet of fluid provided via the single fluid flow path.

15. The flow control system of claim 14, wherein a throat of the nozzle portion is defined between the plurality of curved sidewalls, and wherein the area of the nozzle inlet is selected such that, for pressures meeting a predefined pressure ratio, the oscillating jet of fluid is formed in the throat.

16. The flow control system of claim 15, wherein at the pressures meeting the predefined pressure ratio, a velocity of the fluid at the throat is Mach 1.

17. The flow control system of claim 14, wherein the oscillating jet of fluid oscillates according to at least a first, sweeping mode caused by a plume of the oscillating jet separating from the curved sidewalls.

18. The flow control system of claim 17, wherein the oscillating jet of fluid oscillates according to a second, shedding mode caused by a break-up of the plume, wherein a frequency of the second, shedding mode is greater than a frequency of the first, sweeping mode.

19. A method for managing flow of a fluid, comprising:
receiving a fluid flow through a body inlet formed in a body portion of a fluidic oscillator;

transmitting the fluid flow along a single fluid flow path from the body inlet to a body outlet formed in the body portion opposite the body inlet; and forming, in a throat of a nozzle portion of the fluidic oscillator, an oscillating jet of fluid from the fluid flow, wherein the nozzle portion comprises a plurality of curved sidewalls bowed outward from a nozzle inlet disposed at the body outlet to a nozzle outlet opposing the nozzle inlet, wherein an area of the nozzle inlet is smaller than an area of the nozzle outlet, and wherein the plurality of curved sidewalls is dimensioned to form an oscillating jet of fluid provided via the single fluid flow path.

20. The method of claim 19, wherein the plurality of curved sidewalls extends from the nozzle inlet at angles selected such that the nozzle portion is dimensioned to form the oscillating jet of fluid.

* * * * *